United States Patent [19]

Zlaikha

[11] 4,089,451
[45] May 16, 1978

[54] AUTOMATIC STRIP-FEEDER DEVICE PARTICULARLY FOR DIES

[76] Inventor: Eliyahu Zlaikha, Raziel Street 39, Netanya, Israel

[21] Appl. No.: 729,150

[22] Filed: Oct. 4, 1976

[30] Foreign Application Priority Data

Oct. 3, 1975 Israel .......................................... 48233

[51] Int. Cl.² ...................... B65H 17/22; B65H 17/44
[52] U.S. Cl. ...................................... 226/136; 83/223; 83/229; 192/45; 226/139; 226/148; 226/156; 226/199
[58] Field of Search ............... 226/156, 157, 152, 148, 226/121, 134, 136, 139, 199; 83/223, 229; 192/45

[56] References Cited

U.S. PATENT DOCUMENTS

| 503,984 | 8/1893 | Palmer et al. | 192/45 X |
|---|---|---|---|
| 2,633,193 | 3/1953 | Thompson | 83/229 X |
| 2,732,797 | 1/1956 | Cooper et al. | 226/156 X |
| 3,511,426 | 5/1970 | Whitmore et al. | 226/156 X |
| 3,974,953 | 8/1976 | Klose | 226/199 X |

FOREIGN PATENT DOCUMENTS 1,007,585 5/1952 France ................................ 226/156

*Primary Examiner*—Bruce H. Stoner, Jr.

*Attorney, Agent, or Firm*—Benjamin H. Barish

[57] ABSTRACT

A strip feeder particularly for punch dies comprises drive and idler rollers engageable with opposite faces of the strip being fed, a spring-loaded member displaceable in a first direction during the foward stroke upon receiving an impact and returned by the spring during the return stroke, a first one-way clutch effective to decouple the drive roller from the displaceable member during the forward stroke and to couple same during the return stroke, and a second one-way clutch effective to couple the idler roller to the fixed frame during the forward stroke and to decouple same during the return stroke. The described one-way clutch comprises a first member having an external annular surface and a second member including an internal bore for rotably receiving the latter. The second member further includes a cylindrical cavity terminating at its inner end in a small opening communicating with the bore, the axis of the cavity being at an acute angle with respect to a line tangent to the bore at the center of the opening. A displaceable wedging element is disposed within the cavity and has a nose projectable through the opening, the wedging element being biassed by a spring to permit relative rotation between the two members in one direction but to block same in the opposite direction.

8 Claims, 9 Drawing Figures

4,089,451

AUTOMATIC STRIP-FEEDER DEVICE PARTICULARLY FOR DIES

BACKGROUND OF THE INVENTION

The present invention relates to an automatic strip-feeder for step-feeding work pieces in synchronization with machine operations.

Various types of strip-feeders are known for step-feeding the workpiece strip to the machine tool with each operation of the tool. As a rule, however, the known strip-feeders are of very complicated and expensive construction because of the close synchronism required between the operation of the machine tool and the feeding of the strip to assure that the strip is fed quickly and precisely only during the dwells between tool operations when the tool is out of contact with the workpiece strip.

SUMMARY OF THE INVENTION

According to one aspect of the present invention, there is provided a strip feeder comprising a drive roller engagable with one face of the strip for driving same, an idler roller engagable with the opposite face of the strip, a fixed frame supporting both the rollers, a spring-urged hammer bar pivotably mounted to the frame so as to be pivoted by an impact during a forward stroke and to be spring-returned upon termination of the impact during the return stroke, a displaceable member displaceable in a first direction by the hammer during the forward stroke thereof upon receiving an impact, and a spring connected to the displaceable member to be loaded when it is displaced during the forward stroke, and to return the displaceable member during the return stroke, after termination of the impact. A first one-way clutch is provided between the drive roller and the displaceable member and is effective to decouple the drive roller from the displaceable member during the forward stroke and to couple the drive roller to the displaceable member during the return stroke to feed the strip during said return stroke; and a second oneway clutch is provided between the idler roller and the frame and is effective to couple the idler roller to the fixed frame during the forward stroke of the displaceable member to prevent the movement of the strip, and to decouple the idler roller from the frame during the return stroke of the impact member to permit its being fed by the drive roller.

In the preferred embodiment of the invention described below, each one-way clutch comprises a first member including an external annular surface, and a second member including an internal bore for rotatably receiving the external annular surface of the first member. The second member further includes a cylindrical cavity terminating at its inner end in a small opening communicating with the bore. The axis of the cavity is at an acute angle with respect to a line tangent to the bore at the center of said opening. A displaceable wedging element is disposed within the cavity and has a nose projectable through said opening; and a biassing spring is disposed within the cavity urging the wedging element towards its inner end to project its nose through said opening such that the wedging element is effective to permit relative rotation between the two members in one direction but to block rotation in the opposite direction.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
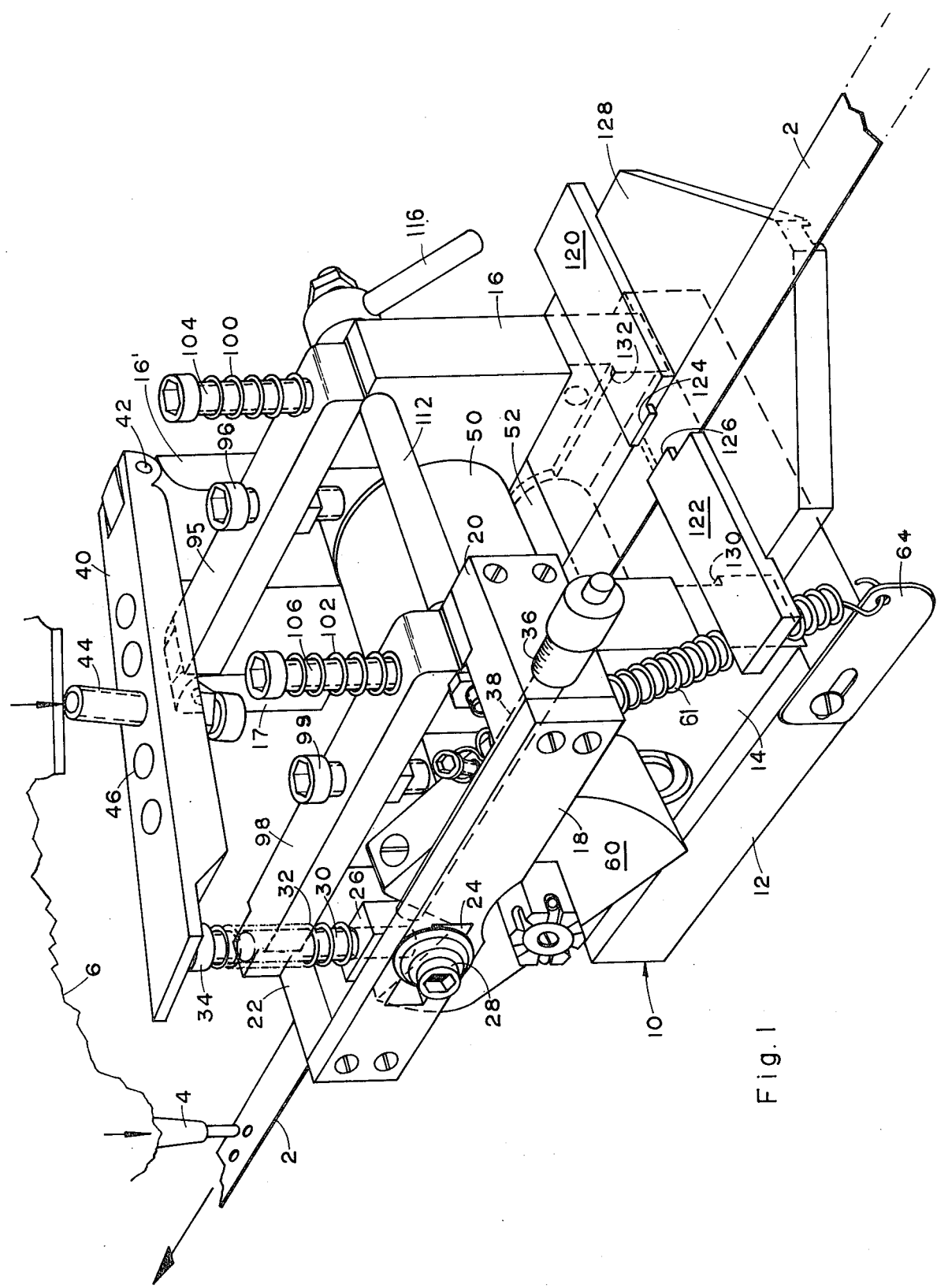
FIG. 1 is a three-dimensional view of an automatic stripfeeder for use with an impact-type machine tool, such as a punch die.

The strip-feeder illustrated in FIG. 1 is for use in feeding a workpiece strip 2, for example of metal, with respect to a punch die 4 which is driven by a power member 6 to punch holes in the strip. The strip-feeder is also driven by the power member 6 to advance the strip 2 one increment or step with each operation of the die 4, the feeder being effective to move the strip only when the punch die is out of engagement with the strip.

The strip-feeder in FIG. 1 includes a frame 10 having a base 12, a pair of vertical side walls 14, 16, and a rear pillar 17. Side wall 14 fixedly mounts a U-shaped member 18 having a front leg 20 and a rear leg 22. Member 18 is further formed with a slot 24 adjustably supporting an apertured block 26 which is fixed in position by a fastener 28. An interposer pin 30 is disposed within the aperture in block 26 and is urged upwardly by means of a spring 32 disposed between block 26 and an enlarged head 34 formed on the pin. The position of block 26, and thereby of interposer pin 30, may be finely adjusted by means of a micrometer 36 having a threaded shank 38 passing through leg 20 of the fixed member and engaging interposer block 26.

The rear end 16′ of frame side wall 16 pivotably supports one end of a hammer bar 40 pivotable about pin 42, the opposite end being engageable with the enlarged head 34 of interposer pin 30 to apply an impact force to the latter whenever the bar receives an impact from the power member 6. The impact from the power member is transmitted to hammer bar 40 by means of a bolt 44 threaded in a selected one of a plurality of openings 46 formed lengthwise of the hammer bar. The force and displacement of the impact end of the hammer bar, and therefore of interposer pin 30 when receiving an impact from the hammer bar, will thus depend on the opening 46 in which bolt 44 is threaded, and also on the extent of threading of the bolt within the selected opening.

The workpiece strip 2 is fed between a pair of rollers 50, 52. Roller 50 constitutes the drive roller and engages the upper surface of strip 2, this roller being driven by the impact applied to interposer pin 30. Roller 52 is an idler roller and engages the lower surface of the strip. Both rollers 50 and 52 include one-way clutches which assure that the strip will be driven one step for each operation of the power member 6 when the punch die is out of engagement with the strip 2.

More particularly, drive roller 50 is rotatable about axis 53 (FIGS. 2 and 3) by means of a shaft 54 and includes an annular end section 56 received within a cylindrical bore 58 in clutch housing 60. A spring 61 is connected between an element 62 on the clutch housing 60 and an element 64 fixed to the feeder frame. Housing 60 is further formed with a ledge or arm 65 and with a pair of cavities 66 whose inner ends terminate in small openings 68 communicating with bore 58. A ball bearing 70 is received within each cavity and is urged inwardly towards its openings 68 by a biassing spring 72 and a closure cap 74, the latter being threaded into the outer end of the cavity to vary the bias of the spring.

The axis 66' of each cavity extends transversely to the axis 53 of rotation of the drive roller 50 and at an acute angle (shown at "α" in FIG. 2) with respect to a line 75 tangent to the inner surface of the clutch housing 60 defining its bore 58, which tangent line passes through opening 68.

The second one-way clutch cooperating with the idler roller 52 is similarly constructed, but is disposed on the opposite side of frame wall 16. It also includes a pair of cavities 76 (only one being illustrated) each terminating at its inner end in a small opening 78, each cavity containing a ball bearing 80, a spring 82, and a threaded closure cap 84. Idler roller 52 rotates on a shaft 85. The one-way clutch housing 86 is fixed to the feeder frame and is formed with a cylindrical bore 88 receiving an annular end section 89 of the idler roller 52. As is the case of the first one-way clutch described above, the axis 76' of cavity 76 extends transversely to the axis 90 of rotation of the idler roller 52 and is at an acute angle ("β") with respect to a line 92 tangent to the inner surface of the cylindrical bore 88 passing through opening 78.

Figure 2:
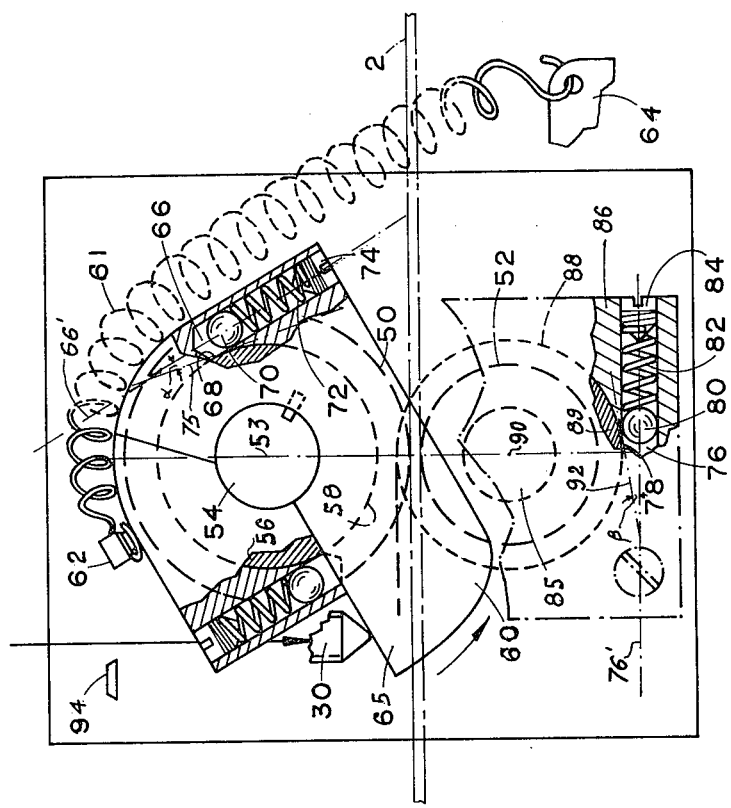
FIG. 2 is an enlarged view, partly in section, illustrating the structure of two one-way clutches includes in the stripfeeder of FIG. 1, the clutches being illustrated in the conditions they are in at the end of the forward stroke of the feeder.
Figure 3:
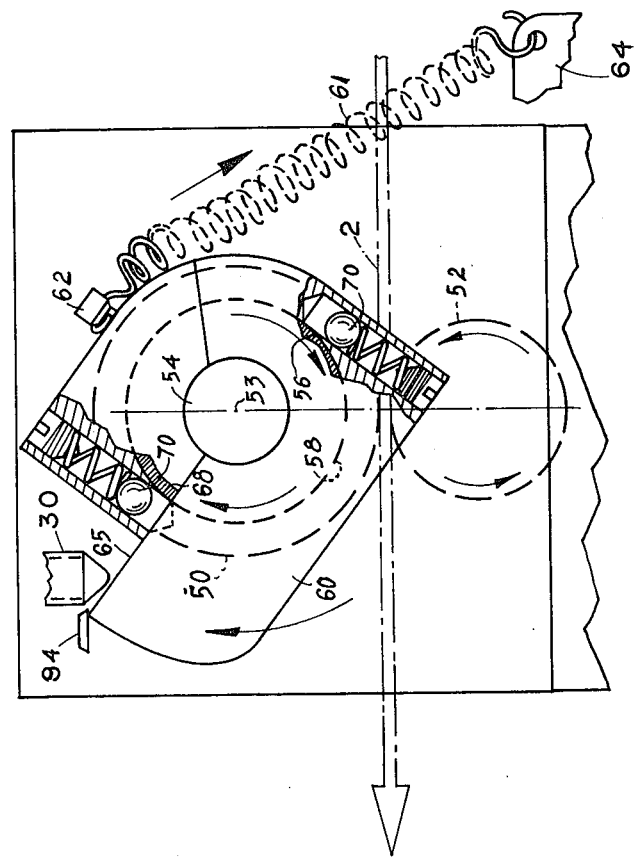
FIG. 3 illustrates one of the one-way clutches of FIG. 2 in its condition at the end of the return stroke.

The clutches illustrated in FIGS. 2 and 3 operate as follows: In the forward stroke of the feeder, when interposer pin 30 impacts against arm 65 of housing 60, the latter housing is rotated in the counter-clockwise direction. This tends to move the balls 70 within cavities 66 towards the outer ends of the cavities, i.e. out of openings 68 at the inner ends. Because of the angle ("α") formed by the axis 66' of each cavity with the tangent line 75 through the center of its opening 68, the balls are moved away from the annular end section 56 of the drive roller 50 received within bore 58 thereby decoupling the housing from the drive roller. Accordingly, housing 60 is free to rotate, loading spring 61 while the drive roller 50 remains idle. Any tendency of the drive roller 50 to rotate within housing 60 (counter-clockwise) would move strip 2 rightwardly, but this movement of the strip is blocked by the second one-way clutch of housing 86, namely, by ball 80 being moved towards the inner end of its cavity 76 and therby wedging between its cavity wall and end section 89 of the idler roller 52.

During the return stroke when impact member 30 has been returned to its upper position (FIG. 3), the previously loaded spring 61 drives housing 60 clockwise. During this movement of housing 60, balls 70 within cavities 66 are displaced towards the inner ends of their respective cavities thereby projecting them further through openings 68 into the bore 58 where they wedge against end section 56 of the drive roller 50, thereby coupling the drive roller and rotating it (clockwise) with the clutch housing 60. This moves strip 2 leftwardly, this movement being permitted by idler roller 52 which is decoupled from the fixed clutch housing 86 during its counter-clockwise rotation. A stop 94 (FIG. 3) limits the return movement of the impact arm 65.

It will be appreciated that the number of cavities and wedging balls, the strength of the springs 72, 82, and the angle ("α" or "β") formed by the axis of the cavitiy with respect to the tangent line through the centre of its opening (68, 78), determine to a large extent the magnitude of the load that can be transmitted through the coupling. The greater the number of cavities and the smaller this angle is, the larger will be the load the coupling is capable of transmitting.

This arrangement has a number of advantages over the conventional one-way clutches. First, it better tolerates wear of the parts. In addition, it is of very simple construction and easy to assemble and disassemble. Further, by appropriately selecting the angles ("α" or "β"), the one-way clutch can be designed for other applications so as to automatically release when subjected to a predetermined overload. Thus, when the clutch is used in the above feeder, the above angle "α" would preferably be about 8°–13°, but when used in another application to provide automatic overload release, it probably would be 13°–20°.

Figure 4A:
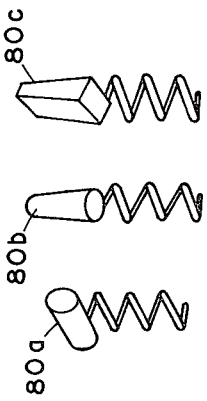
FIGS. 4a–4d illustrate variations that may be made in the one-way clutch of FIGS. 2 and 3.
Figure 4B:
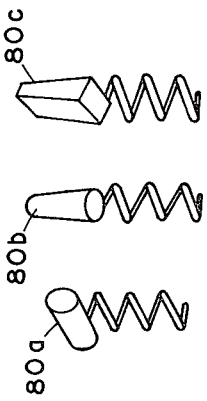
Figure 4C:
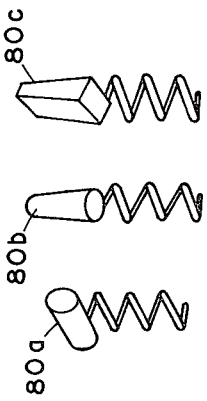
Figure 4D:
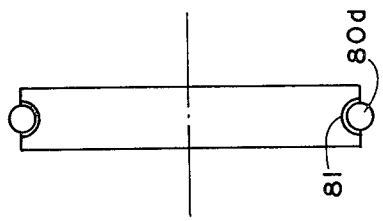

FIGS. 4a–4c illustrate various other wedging elements thay may be used in the one-way clutches instead of balls 70 and 80. Thus, the wedging element is illustrated as a roller bearing 80a in FIG. 4a, as a conical bearing 80b FIG. 4b, and as a tapered block 80c in FIG. 4c. FIG. 4d illustrates a further variation wherein the bearing, for example a ball bearing 80d, may contact an annular recess surface 81 of the member being coupled, rather than a simple cylindrical surface as illustrated in FIGS. 2 and 3.

The strip-feeder shown in the drawings also includes means to facilitate the initial loading of the strip 2 between the drive roller 50 and the idler roller 52. The latter means are particularly illustrated in FIGS. 1 and 5.

Figure 5:
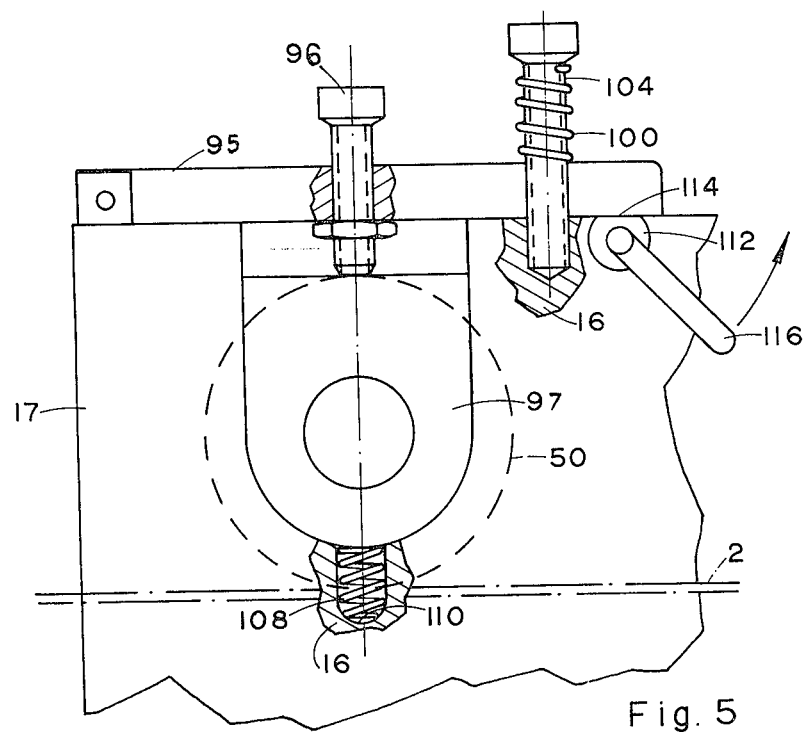
FIGS. 5 illustrates certain elements in the strip-feeder of FIG. 1 which are involved in initially loading the feeder with the workpiece strip.

Thus, as shown particularly in FIGS. 1 and 5, the rear wall 17 pivotably supports an arm 95 including a threaded bolt 96 engaging a bracket 97 supporting one end of the drive roller 50. Another arm 98 is similarly pivoted from leg 22 of frame 10 and includes another bolt 99 threaded therein for engaging another bracket (not shown) on the opposite end of drive roller 50. Both arms 95 and 98 are urged downwardly by means of springs 100, 102 encircling bolts 104, 106 passing through apertures in the respecting arms 95, 98 and threaded into members (e.g. 16 for bolt 104, in FIG. 5) fixed to the frame, the lower ends of the spring bearing against their respective arms 95, 98 and the upper ends bearing against enlarged heads on the respective bolts, 104, 106. Thus, the two arms 95, 98 and their respective bolts 96, 99 are spring-urged downwardly against the brackets supporting the drive rollers 50, the force of the spring being presettable by the extent bolts 104, 106 are threaded into their respective frame members (e.g. 16).

Opposing the downward force applied by springs 100, 102 to the drive roller 50 are a pair of springs 108 (one of which is shown in FIG. 5) disposed within bore 110 formed in each side wall 14, 16 of the frame and bearing against the drive-roller supporting brackets 97. Springs 108, however, are much weaker than springs 100, 102, so that in the normal position, the latter springs are effective to urge the drive roller 50 downwardly against the strip 2 being fed.

However, when initially loading a strip, arms 95, 98 may be pivoted upwardly to cause their respective bolts 96, 99 to disengage from the supporting brackets 97 of the drive roller 50, whereupon spring 108 becomes effective to lift the drive roller away from the idler 52. This lifting of arms 95, 98 is effected, in the device illustrated in the drawings, by means of a rotatable rod 112 having a flat face 114 (FIG. 5) engaging the undersides of the two arms 95, 98, which rod is rotated by a handle 116 to lift the levers, and thereby to permit the drive roller 50 to separate from the idler roller 52 to facilitate the initial loading of the strip between them.

The device illustrated in the drawings also includes an arrangement for guiding the strip 2 as it moves between the drive and idler rollers 50, 52. Also described is a guiding arrangement which is conveniently adjustable to accommodate different width strips.

With reference first to FIG. 1, the guiding arrangement includes a pair of guide bars 120, 122 spaced from each other according to the width of the strip 2 being fed. Each guide bar, however, includes an overhang 124, 126 partially overlying the strip to prevent its unseating from the space between the two guide bars. The two guide bars are supported on a supporting member 128 fixed to the sidewalls 14, 16 and received within grooves 130, 132 formed in these sidewalls. The grooves extend for the complete length of these sidewalls, so that member 128 may be applied at the opposite side for strip-feeding from that direction.

Figure 6:
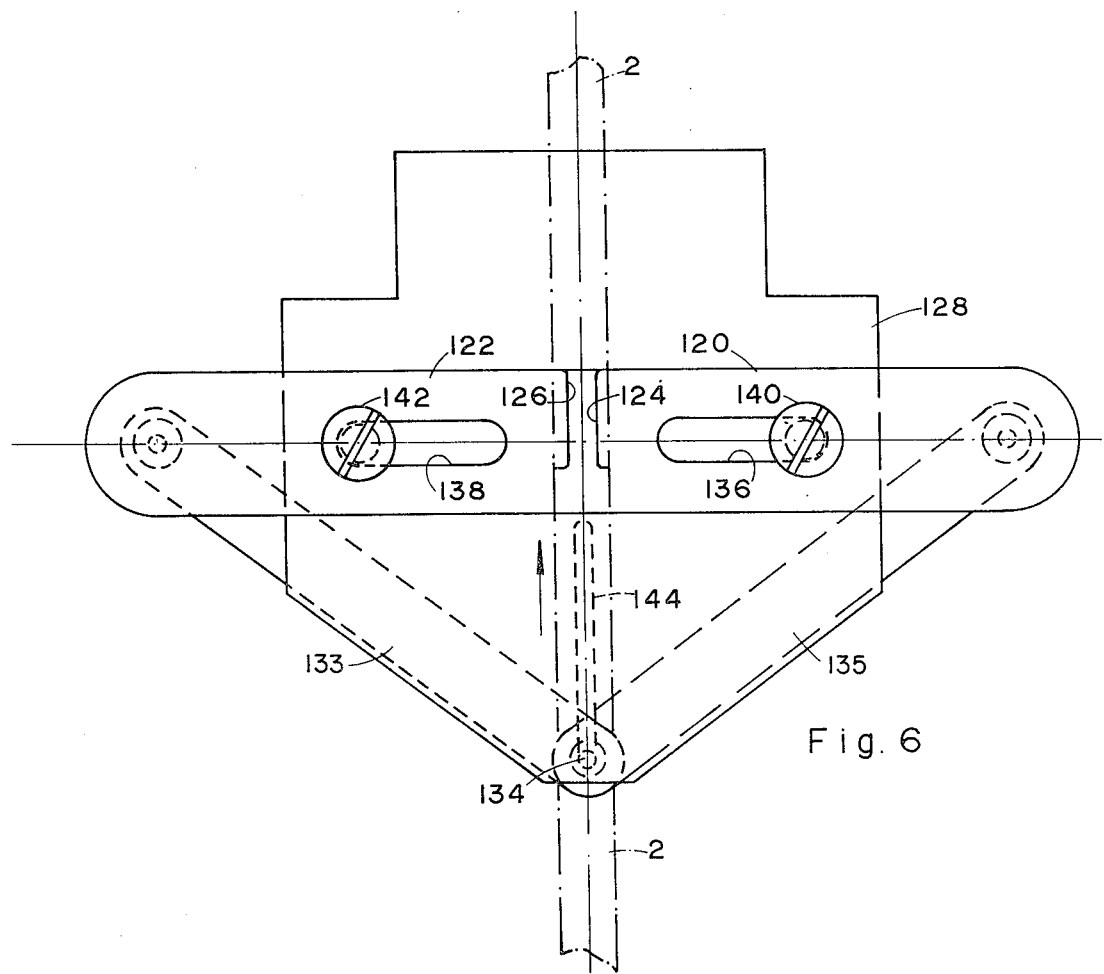
FIG. 6 is an enlarged view illustrating a strip guiding arrangement that may be used in the strip-feeder of FIG. 1.

FIG. 6 illustrates an arrangement that may be used for conveniently varying the space between the two guide bars 120, 122, in order to accommodate different width strips 2. Thus, as shown in FIG. 6, there are provided two links 133, 135 pivotably mounted to each other at one end by a pin 134, and pivotably mounted at the opposite ends to the outer ends of the two guide bars 120, 122. The guide bars 120, 122 are formed with elongated slots 136, 138 each receiving a threaded fastener 140, 142 threaded into the underlying base 128. The latter base is also formed with a deep recess 144 aligned with pivot pin 134. It will thus be seen that pin 134 may be moved within recess 144 of base 128, towards the two guide bars 120, 122 in order to spread them apart and thereby to accommodate larger width strips, or away from the guide bars in order to move them closer to each other and thereby to accommodate smaller width strips. Before this adjustment, threaded fasteners 140, 142 are loosened, and are retightened after the adjustment has been completed.

The device illustrated can also be used for pulling the strip by providing the drive and idler rollers on the opposite side of the feeder, or for pushing and pulling the strip by providing it on both sides of the die. Further, if the strip 2 is particularly thin, the power member 6 may be provided with a stop blocking the return of clutch housing 60 until the die punch has completed its disengagement from the strip to prevent its buckling. In addition, the clutch housing 60 may be coupled to the drive roller 50 via a motion-amplifying device, such as a gear or belt, to increase the relation of the drive roller, and therefore the displacement of the strip, for each operation of the clutch.

What is claimed is:

1. A strip feeder comprising: a drive roller engagable with one face of the strip for driving same; an idler roller engagable with the opposite face of the strip; a fixed frame supporting both said rollers; a spring-urged hammer bar pivotably mounted to the frame so as to be pivoted by an impact during a forward stroke and to be spring-returned upon termination of the impact during the return stroke; a displaceable member displaceable in a first direction by the hammer bar during said forward stroke thereof upon receiving an impact; a spring connected to the displaceable member to be loaded when it is displaced during the forward stroke, and to return the displacement able member during the return stroke after termination of the impact; a first one-way clutch between the drive roller and the displaceable member and effective to decouple the drive roller from the displaceable member during the forward stroke thereof and to couple the drive roller to the displaceable member during said return stroke; and a second one-way clutch between the idler roller and the frame and effective to couple the idler roller to the fixed frame during the forward stroke of the displaceable member to prevent the movement of the strip, and to decouple the idler roller from the frame during the return stroke of the impact member to permit its being fed by the drive roller.

2. A strip feeder according to claim 1, further including an interposer engageable by the hammer bar for transmitting the impact to said displaceable member.

3. A strip feeder according to claim 2, wherein the hammer bar includes a plurality of openings at different distances from the pivotal mounting thereof, and an impact element receivable in a selected one of said openings for varying the magnitude and displacement of the impact on the interposer.

4. A strip feeder according to claim 1, further including a pair of guiding members spaced apart according to the width of the strip, and means for adjusting their spacing to accommodate different width strips.

5. A strip feeder according to claim 4, wherein said adjusting means comprises a pair of links pivotable at one end to each other, each link being pivotable at its opposite end to one of the guiding members, the pivotable point of said one end of the links being movable towards and away from the guiding members to thereby space them further apart or closer together, and means for fixing the position of the guiding members.

6. A strip feeder according to claim 5, in combination with an impact type machine tool having a power member for applying impacts to the machine tool, the displaceable member receiving an impact from the power member at the same time the machine tool receives such an impact, the strip feeder being effective to feed the strip to the machine tool during the return stroke of the power member.

7. A strip feeder according to claim 1, wherein said first one-way clutch comprises an external annular surface formed on said drive roller, and an internal bore formed in said displaceable member for rotatably receiving said external annular surface of the drive roller; said displaceable member further including a cylindrical cavity terminating at its inner end in a small opening communicating with said bore; the axis of said cavity being at an acute angle with respect to a line tangent to said bore at the center of said opening; a wedging element disposed within said cavity and having a nose projectable through said opening; and a biassing spring disposed within said cavity urging said wedging element towards its inner end to project its nose through said opening such that the wedging element is effective to permit relative rotation between said drive roller and displaceable member in one direction but to block rotation in the opposite direction.

8. A device according to claim 7, wherein said wedging element is a ball bearing, and said cavity is closed at its outer end by a threaded cap for varying the spring bias applied to the ball bearing.

* * * * *